J. E. MAGNER.
CABLE TRAVELER.
APPLICATION FILED APR. 20, 1909.
945,184. Patented Jan. 4, 1910.
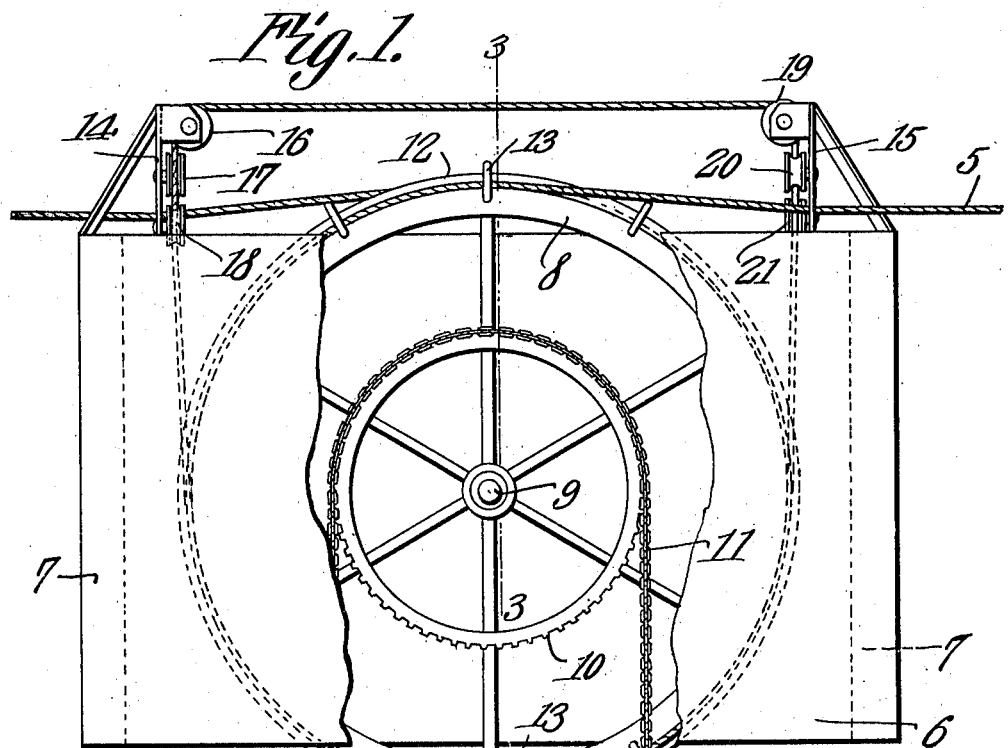
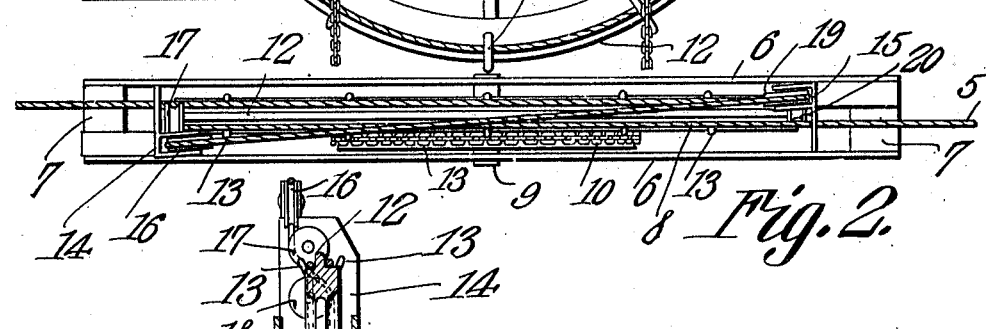
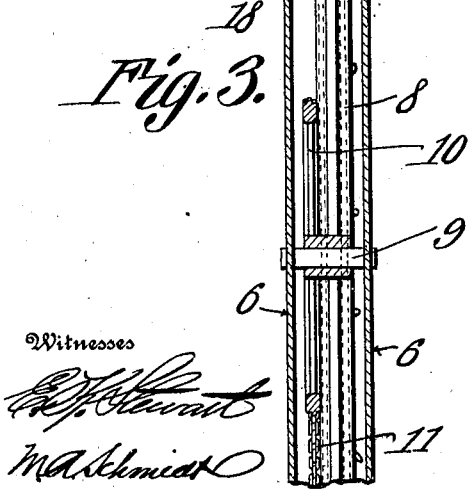
Inventor
James E. Magner.
By C. A. Snow & Co.
Attorneys
Witnesses

UNITED STATES PATENT OFFICE.

JAMES E. MAGNER, OF AVOCA, MINNESOTA.

CABLE-TRAVELER.

945,184.	Specification of Letters Patent.	Patented Jan. 4, 1910.

Application filed April 20, 1909. Serial No. 491,013.

*To all whom it may concern:*

Be it known that I, JAMES E. MAGNER, a citizen of the United States, residing at Avoca, in the county of Murray and State of Minnesota, have invented a new and useful Cable-Traveler, of which the following is a specification.

The present invention has for its object to provide in a cable traveler improved means for mounting the carriage on the cable-way, and for propelling the same, and to this end, it consists in a novel arrangement of guide pulleys, and improved structural details to be hereinafter fully described and claimed, reference being had to the drawing hereto annexed forming a part of this specification, in which drawing—

Figure 1 is a front elevation of the traveler partly broken away. Fig. 2 is a plan view. Fig. 3 is a sectional detail on the line 3—3 of Fig. 1.

Referring to the drawings, 5 denotes the cable-way on which the traveler is mounted. Said traveler or carriage comprises cheek plates 6 which are spaced apart a suitable distance by means of spacing blocks 7 between the ends thereof, the spacing blocks and cheek plates being securely fastened together.

Between the cheek plates is mounted a pulley 8 around which the cable 5 is carried. The said pulley is mounted on an axle 9 journaled in suitable bearings in the cheek plates. The pulley is also formed with a chain pulley 10 over which an endless chain 11 passes. If desired the chain pulley need not be formed integral with the pulley 8, but may be mounted loosely on the axle 9, and fastened to said pulley 8 in order that both pulleys may rotate together. The function of the pulley 10 is to rotate the pulley 8, whereby the carriage is propelled along the cable 5, the pulley 10 being thus actuated by means of the endless chain 11 which extends downwardly toward the floor of the shop or other place in which the traveler is mounted, and within reach of the workmen. It will be apparent that a downward pull on one stretch of the chain will propel the traveler in one direction, whereas a pull on the other stretch of the chain will propel the traveler in the opposite direction. The traveler is therefore under control, and can be readily moved along the cable-way. It will be understood of course that the traveler will be provided with some sort of suspension device for carrying the load.

The rim of the pulley 8 has a central annular flange or rib 12, and from the edges of the pulley project guide fingers 13 which serve to retain the cable on the rim of the pulley. By the rib 12 and fingers 13, the cable may be passed around the pulley twice, without the two ends of the cable interfering with each other.

In order to hold the cable 5 at the proper tension on the pulley 8, so that the latter will not slip, and also for the purpose of properly guiding the two ends of the cable, the following arrangement of guide pulleys is provided: From the traveler, near the ends thereof, rise brackets 14 and 15 respectively. On the bracket 14 are mounted idler pulleys 16, 17 and 18, and on the bracket 15 are mounted similar pulleys 19, 20 and 21. The axes of the pulleys 17, 18, 20 and 21 extend at right angles to the axis of the pulley 8. The pulleys 17 and 18 are spaced apart vertically a short distance so that the cable as it travels between said pulleys has a tortuous path. The pulleys 20 and 21 are arranged in a similar manner. The pulley 16 is located above the pulleys 17 and 18, and its axis extends nearly parallel to the axis of the pulley 8, it being canted slightly to one side. The axis of the pulley 19 extends parallel to the axis of the pulley 16.

By the herein described arrangement of idler pulleys, the cable 5 is held at the proper tension, and guided to the pulley 8 in the following manner: The end of the cable to the left passes through an opening in the bracket 14, said opening being in alinement with that portion of the pulley rim between the guide fingers 13 on one side thereof, and the rib 12. This end of the cable passes around this portion of the pulley, thence upwardly over the pulley 18, along one side thereof, and across to the other side of the pulley 17, and thence upwardly to the pulley 16. The pulley 18 is so located with respect to that portion of the pulley rim on which the herein described portion of the cable travels, that said portion extends to said pulley 18 in a straight line, thus effectually preventing it from slipping off the pulley 8. From the pulley 16 the cable crosses over to the pulley 19, and passes from the same to the pulley 20 on one side thereof, and then crosses over and passes along the other side of the pulley 21, and thence around the pulley 8, it being held spaced from that portion of the cable already described by the rib 12. The pulley 21 is so located that the cable passes to the pulley 8 in a straight line. After leaving the pulley 8, the cable passes through an opening in the bracket 15. The two ends of the cable pass around the pulley 8 in opposite directions, by reason of which it will be apparent that when the pulley 8 is rotated in one direction, the traveler will be propelled in one direction, whereas when the pulley is rotated in the opposite direction, the traveler will also be propelled in the opposite direction.

What is claimed is:

1. In a cable traveler, a cable, a carriage, a pulley mounted on the carriage, around which pulley the cable passes, one end of the cable passing around the pulley in one direction, and the other end of the cable in the opposite direction, means on the pulley for spacing the two ends of the cable thereon, and means at opposite sides of the pulley for guiding the respective ends of the cable thereto, and means for rotating the pulley.

2. In a cable traveler, a cable, a carriage, a pulley mounted on the carriage, around which one end of the cable is passed in one direction, and the other end of said cable in the opposite direction, a pair of idler pulleys mounted on the carriage at opposite sides of the pulley, said idler pulleys being arranged to provide a tortuous path for the respective ends of the cable as they pass to the first-mentioned pulley, an idler pulley adjacent to each pair of the aforesaid idler pulleys, for guiding the cable from one of said pairs to the other pair, and means for rotating the first-mentioned pulley.

3. In a cable traveler, a cable, a carriage, a pulley mounted on the carriage, around which pulley the two ends of the cable pass in opposite directions, a pair of idler pulleys mounted on the carriage at opposite sides of the first-mentioned pulley, the members of each pair of said idler pulleys being arranged to provide a tortuous path for the cable, and one of the members of said pair being located to guide the ends of the cable to their respective positions on the pulley, an idler pulley adjacent to each pair of the aforesaid idler pulleys, for guiding the cable from one of said pairs to the other pair, and means for rotating the first-mentioned pulley.

In testimony that I claim the foregoing as my own, I have hereto affixed my signature in the presence of two witnesses.

JAMES E. MAGNER.

Witnesses:
E. V. TROUT,
OTTO P. RAKNESS.